United States Patent [19]
Lemieux

[11] Patent Number: 6,139,081
[45] Date of Patent: Oct. 31, 2000

[54] VEHICLE STRUCTURAL MEMBER

[75] Inventor: Michael J. Lemieux, Lindstrom, Minn.

[73] Assignee: General Safety Equipment, Wyoming, Minn.

[21] Appl. No.: 09/064,042

[22] Filed: Apr. 21, 1998

[51] Int. Cl.[7] ........................................... B60N 3/12
[52] U.S. Cl. .................. 296/37.7; 296/37.1; 296/37.6; 296/183
[58] Field of Search .................... 296/37.6, 183, 296/37.1, 37.5, 37.8, 37.7, 187, 193, 194, 195, 196, 197, 106, 115, 120, 144, 146, 148, 155, 205; D25/124, 125

[56] References Cited

U.S. PATENT DOCUMENTS

| | | | |
|---|---|---|---|
| D. 289,203 | 4/1987 | Hardy | D25/74 |
| D. 308,103 | 5/1990 | Westphal et al. | D25/124 |
| D. 356,283 | 3/1995 | Christensen | D25/125 |
| 4,277,095 | 7/1981 | Barruw | 296/183 |
| 4,379,585 | 4/1983 | Strick | 296/146 |
| 4,685,695 | 8/1987 | LeVee | 296/37.6 |
| 4,852,937 | 8/1989 | Lemieux | 296/183 |
| 5,052,741 | 10/1991 | Brown et al. | 296/191 |
| 5,267,773 | 12/1993 | Kalis, Jr. et al. | 296/183 |
| 5,287,813 | 2/1994 | Hanni et al. | 105/396 |
| 5,320,403 | 6/1994 | Kazyak | 296/203 |
| 5,368,357 | 11/1994 | Kalis, Jr. et al. | 296/183 |
| 5,421,645 | 6/1995 | Young | 312/108 |
| 5,553,427 | 9/1996 | Andres | D25/125 |
| 5,593,245 | 1/1997 | Herz et al. | 403/403 |
| 5,613,726 | 3/1997 | Hobbs et al. | 296/181 |
| 5,615,922 | 4/1997 | Blanchard | 296/37.6 |
| 5,617,696 | 4/1997 | Young . | |
| 5,653,494 | 8/1997 | Cleall et al. | 296/182 |
| 5,683,128 | 11/1997 | Heyns | 296/115 |

*Primary Examiner*—D. Glenn Dayoan
*Assistant Examiner*—Lori L. Coletta
*Attorney, Agent, or Firm*—Woodard, Emhardt, Naughton Moriarty & McNett

[57] ABSTRACT

A channel member forming the structure of a compartment structure for a vehicle. A generally C-shaped channel member is used to define compartments and also provide load carrying capability and attachment features for a compartment structure of a vehicle. The channel member includes a plurality of external T slots useful for mounting components and shelves within the compartment, and at least one internal T slot for mounting components within the interior of the C channel. Also, a method and apparatus for attaching the compartment structure to a transverse structural member is shown and described.

66 Claims, 9 Drawing Sheets

VEHICLE STRUCTURAL MEMBER

BACKGROUND OF THE INVENTION

The present invention relates generally to structural members with an open channel, especially those structural members used in the compartment structure of a vehicle. However, certain applications in the present invention may be outside of this field.

Vehicles such as firetrucks, pickup trucks, various utility vehicles, and other vehicles are sometimes required to have storage compartments accessible from the exterior of the vehicle. The compartment structure that defines the compartments may be integrated into the body and frame of the vehicle, or may be formed separately and attached to the vehicle frame. It is typical for the walls of the compartments to be fabricated from sheet metal attached to a framework of structural members, or in some applications by molding the walls of the compartment in a single unit from a material such as a plastic.

The compartments may be used to store a variety of equipment in a variety of shapes and sizes. It is sometimes necessary to attach brackets such as shelf standards to the walls of the compartment to support modular shelving to obtain optimum utilization of the volume of the compartment.

Sometimes it is useful to route electrical wiring and install various components within the compartment structure. In a compartment formed from closed structural members, the volume within the structural member may not be available as an electrical raceway or area in which to mount components. In such applications it may be necessary to locate the electrical wiring within the compartment, thus making it vulnerable to being damaged by other equipment stored within the compartment.

There is a continuing need for improvements in the field of structural members. The present invention provides improvements in a novel and unobvious way.

SUMMARY OF THE INVENTION

One aspect of the present invention concerns an apparatus which includes a compartment structure. The compartment structure defines at least one compartment for a vehicle. The compartment structure includes a plurality of elongate structural members. At least one of the elongate structural members has a cross-section that is generally C-shaped and defines an interior. There is a first elongate slot within the interior of the structural member. The first elongate slot is adapted to restrain movement of a fastener used for attaching a component within the interior.

It is an object of the present invention to provide an improved structural member for a compartment structure for a vehicle.

These and other objects of the present invention will be apparent from the description of the drawings, the drawings, the description of the preferred embodiment, and the claims to follow.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides an improved apparatus for compartments within utility sections of vehicles. The present invention includes a C-shaped cross-sectional channel for the compartment structure of the utility section of a vehicle. The structural member provides a plurality of T slots for mounting various equipment and components within the compartments. The T slots of the present invention eliminate the need for bulky, intrusive shelf standards for mounting shelves in the compartment, thus providing additional useful area within the compartment otherwise taken up by the shelf standards. In other embodiments of the present invention components that need to be protected from rough handling, equipment, and water are placed within the interior of the channel member and covered with a panel. In other embodiments, a roll up door is mounted above the compartment structure and partly within the interior of a top channel member. The roll up door is easily removed during an emergency if it is jammed, and the top channel member protects the interior of the compartment from water or contamination that may fall off of the door in the stowed away position.

One embodiment of the present invention involves an elongate structural member with a C-shaped cross-sectional shape useful in a compartment structure of a vehicle. The structural members provide the side walls of the compartments within the compartment structure, provide the structural members that form the structure of the compartment structure, provide an interior area within the channel shape for routing of electrical wires and various components, and also provide T slots for mounting shelves and other components within the compartment. The edges of the elongate opening of the channel shape includes shoulders that permit attachment of an access panel to the structural member so as to protect items fastened within the interior of the channel member. A pair of mounting slots are located within the interior for attachment of components located therein.

Another embodiment of the present invention provides an apparatus for joining an elongate structural member to a structural beam so as to transfer the load of the compartment structure into the vehicle frame. A first hole in the shape of the cross-section of the structural beam is formed in a side of the structural member. A second hole is formed within a plate which is attached within the interior of the structural member. The beam is inserted through the first hole in the side of the structural member and also through the second hole in the plate. The structural beam is attached to the first hole and to the second hole. The other end of the beam may be attached to another compartment structure on the other side of the vehicle.

Figure 1:
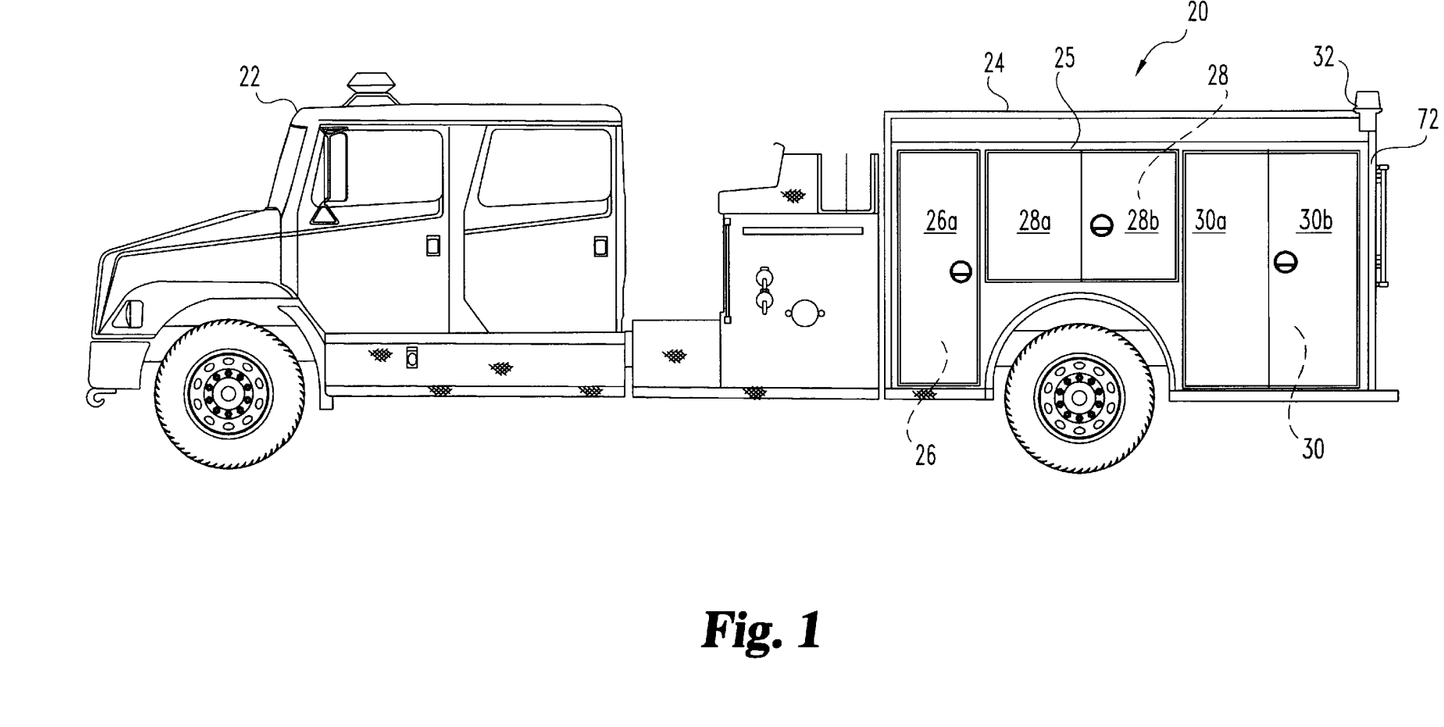
FIG. 1 is a side elevational view of a vehicle incorporating one embodiment of the present invention.

FIG. 1 is a side elevational view of a vehicle incorporating one embodiment of the present invention. In one embodiment of the present invention, vehicle 20, such as a fire truck, includes a cab section 22 for a driver and passengers, and a utility section 24 for various items that are carried by vehicle 20. Vehicle 20 is shown and described as a fire truck, although the present invention is useful with other types of vehicles that incorporate a utility section 24. By way of example only, such vehicles include trucks, busses, utility vehicles, recreational vehicles, and trailers.

Utility section 24 includes at least one storage compartment. Utility section 24 of fire truck 20 includes a first compartment structure 25. In a more preferred embodiment, firetruck 20 includes first compartment 26 in front of a rear wheel, second compartment 28 above the rear wheel, and third compartment 30 behind the rear wheel. Compartments 26, 28, and 30 are covered by doors 26a, 28a, and 28b, and 30a and 30b, respectively. A telescopic light 32 is mounted to the rear of first compartment structure 25, such that the pole for light 32 is attached to a rear vertical channel member 72 to be discussed later.

Figure 2:
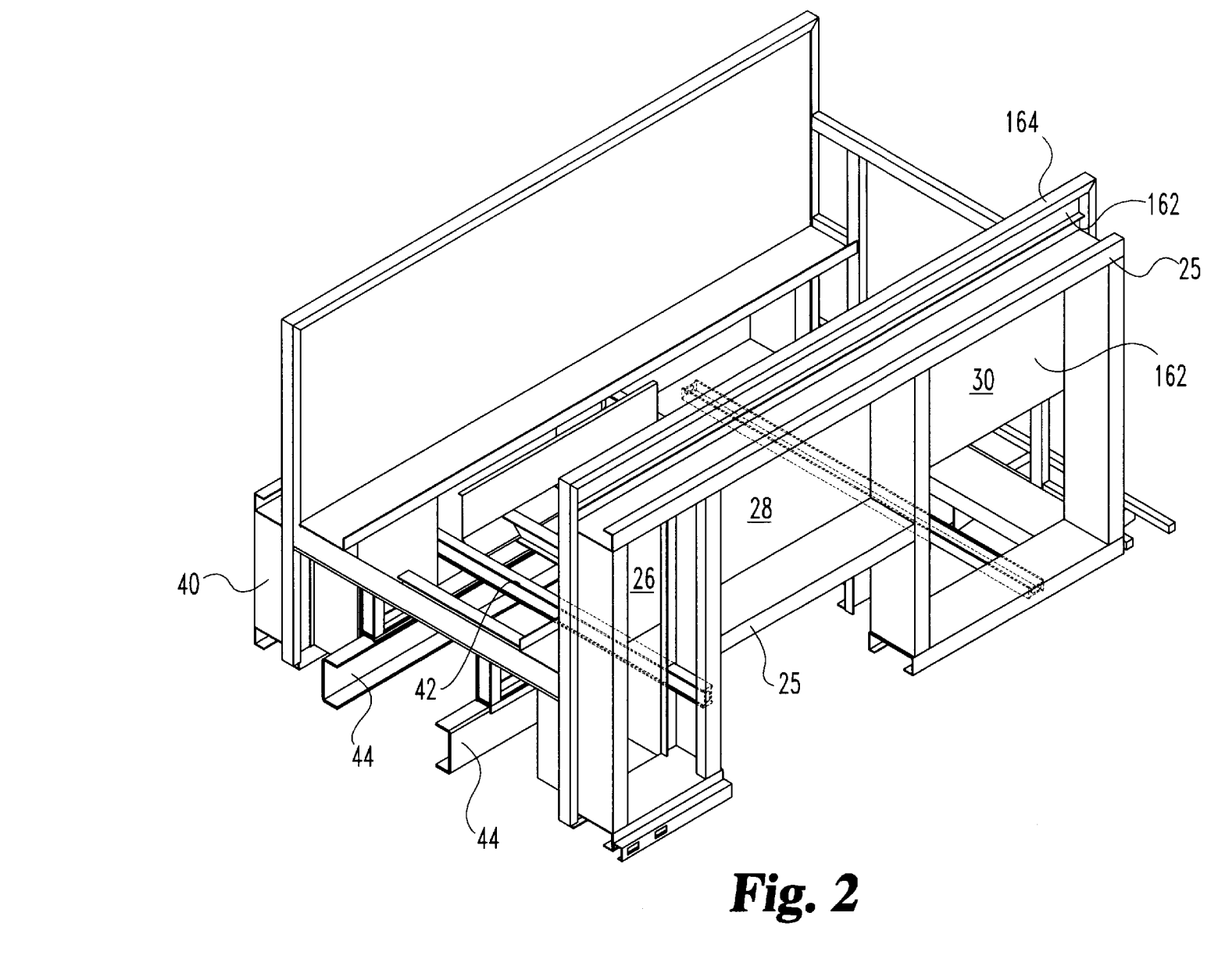
FIG. 2 is a front, top, and left side perspective view of a portion of a utility section of the vehicle of FIG. 2.

FIG. 2 is a front, top, and left side perspective view of a portion of utility section 24 incorporating one embodiment of the present invention. First compartment structure 25 on the left side of utility section 24 is attached to a second compartment structure 40 on the right side of section 24 by a first transverse structural beam 42. Structural beam 42 is attached to compartment structure 25 within compartment 26. A second transverse structural beam (not shown) is attached to structure 25 within compartment 30, the second structural beam attaching first compartment structure 25 to second compartment structure 40 in a manner similar to that of first attachment beam 42. The transverse structural beams are attached to vehicle frame 44 by U-bolts (not shown).

Figure 3:
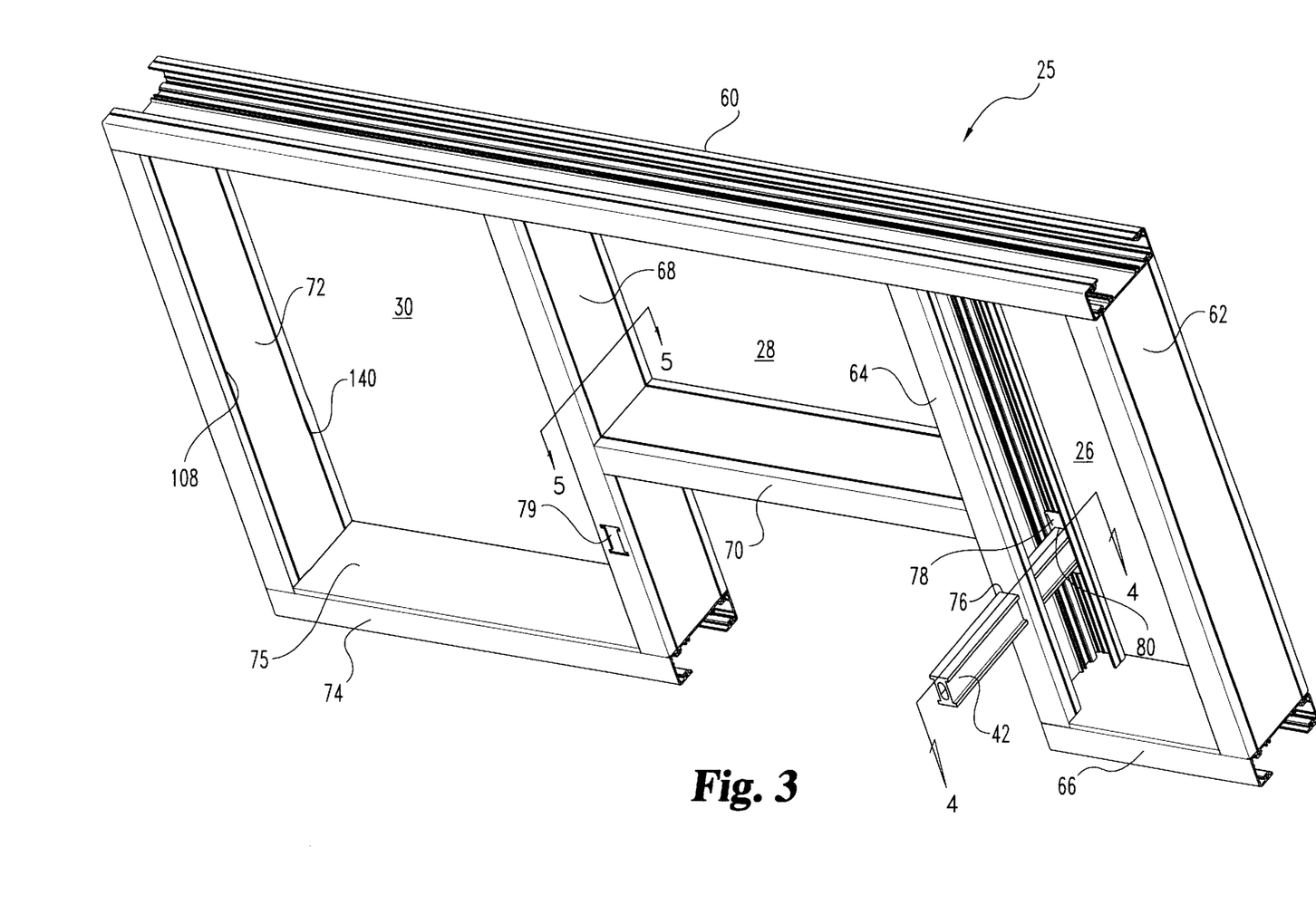
FIG. 3 is a front, top, and right side perspective view of a compartment structure according to one embodiment of the present invention.

FIG. 3 is a top, forward, and right side perspective view of a compartment structure according to one embodiment of the present invention. Compartment structure 25 includes at least one compartment and at least one elongate structural member such as top channel member 60. Preferably, structure 25 includes a plurality of compartments and a plurality of elongate channel members. In one embodiment of the present invention compartment structure 25 includes a top channel member 60 with a C-shaped cross-sectional shape that forms a wall at the top of compartments 26, 28, and 30. A forward vertical channel member 62, a first intermediate channel member 64, and a first bottom channel member 66 comprise other boundaries or walls of first compartment 26. Portions of first intermediate channel member 64 and second intermediate channel member 68, and second bottom channel member 70 form walls of second compartment 28. Member 68, rear channel member 72, and third bottom member 74 form walls for third compartment 30.

Channel members 60, 62, 64, 66, 68, 70, 72, and 74 preferably have cross-sectional shapes that are generally C-shaped, and are preferably aluminum extrusions, so as to not add excessive weight to vehicle 20. However, the present invention also contemplates channels fabricated from materials other than aluminum, including by way of example only, steel and structural non-metallic materials including composites. In addition, although the use of an extrusion process has been described, the present invention also contemplates other fabricating methods suitable for producing the generally C-shaped cross-sectional shape, T slots, shoulders, and other features of the present invention, including by way of example only multipiece structures fabricating by forming, welding, casting or molding. In a most preferred embodiment of the present invention channel members 60, 62, 64, 66, 68, 70, 72 and 74 have the same C-shaped cross-sectional shape and are extruded on common tooling. Those of ordinary skill in the art will recognize that a compartment structure may be arranged in a variety of different arrangements using the channel members described herein. Also, the present invention contemplates compartment structures that incorporate a mixture of C-shaped channel members and other shapes of structural members.

One method and apparatus for attaching structural beam 42 to intermediate channel member 64 according to one embodiment of the present invention is shown in FIG. 3. First structural beam 42 protrudes through a first hole 76 defined in a side of structural member 64. First hole 76 is generally in the shape of the cross-sectional shape of structural beam 42. A second hole 79 defined within a side of channel member 68 is also generally in the shape of the cross-sectional shape of structural beam 42. The present invention contemplates attachment of one or more structural beams to one or more C-shaped channel members at a variety of locations within a compartment structure. Those of ordinary skill in the art will recognize the acceptable locations for attachment of the structural beam to the channel member taking into account the specific shape and loads of the compartment structure, the configuration of the vehicle frame, and the general arrangement of the utility section.

Figure 4:
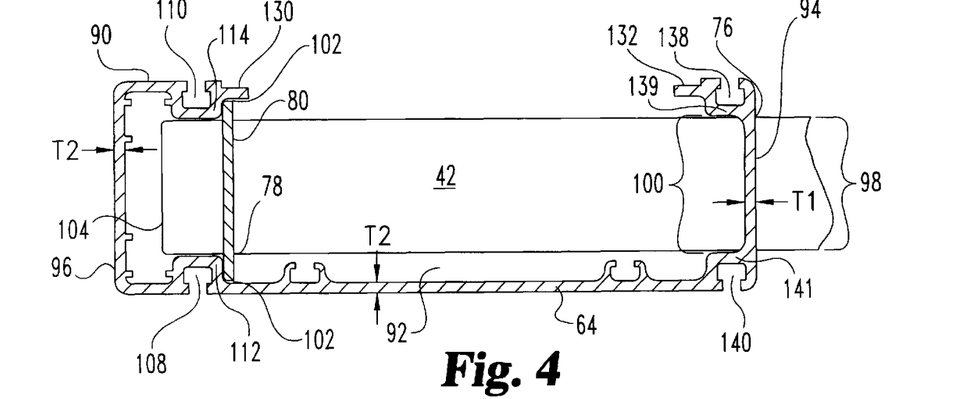
FIG. 4 is a view of the attachment of a beam and channel member as taken along line 4—4 of FIG. 3.

FIG. 4 is a view of the attachment of structural beam 42 to a channel member as taken along line 4—4 of FIG. 3. Elongate structural member 64 has a generally C-shaped cross-sectional shape 90 which defines an interior 92. First hole 76 is defined within first side 94 of channel member 64. Hole 76 is preferably machined into first side 94 by routing the material between slot walls 139 and 141 of T slots 138 and 140, respectively. Structural beam 42 has a width 98 that is less than the width 100 of first side 94 between slot walls 139 and 141 through which a hole may be suitably machined. Member 64 also includes a second side 96 which is generally opposite of first side 94. A plate 78 adapted to fit within interior 92 of member 64 is attached, and preferably fused, to member 64 generally adjacent to second side 96. Plate 78 preferably defines within it a second hole 80 also in the general shape of the cross-sectional shape of structural beam 42.

In one preferred embodiment of the present invention, beam 42 preferably passes through both hole 76 and hole 80, with end 104 of beam 42 extending past plate 78 and toward side 96. In another preferred embodiment of the present invention the other end of beam 42 (not shown) is attached to second compartment structure 40. In one embodiment plate 78 is attached to channel 64 along locations 102 preferably by a fusion method such as welding, although other joining methods known to those of ordinary skill in the art are also contemplated by the present invention, including by way of example only bolting. Channel member 64 includes a pair of generally opposed external elongated T slots 108 and 110. T slots 108 and 110 are defined by slot walls 112 and 114, respectively. Slot walls 112 and 114 provide locations for joining of plate 78 to channel member 64. Beam 42 is coupled to both first side 94 and also to plate 78. In one embodiment of the present invention beam 42 is fused to first side 94 along the shape of first hole 76, and likewise end 104 of beam 42 is fused to plate 78 along the shape of hole 80. In another embodiment of the present invention hole 80 is not machined into plate 78, and beam 42 is fused to the face of plate 78.

First hole 76 is defined within first side 94 between the corners of side 94. Slot 138 is located in one corner and slot 140 is located in the other corner. Walls 139 and 141 are radiused into first side 94. By placing first hole 76 within the radiused area between wall 141 and side 94 and wall 139 and side 94 the load carrying capability of the joint from the channel member to the structural beam is increased because of the increased thickness of the material in the radius area. In addition, locating T slots 138 and 140 adjacent first side 94 such that a wall of T slots 138 and 140 is common with side 94 further increases the strength and rigidity of first side 94 and increases the ability of first side 94 to accept a hole 76 and still retain sufficient strength and rigidity.

First side 94 preferably has a typical wall thickness T1 that is greater than the typical wall thickness T2 of other portions of the channel member thus improving the load carrying capability of first side 94 while maintaining other portions of the channel member at a lightweight and economical thickness. In one embodiment of the present invention thickness T1 is about 0.27 inches and thickness T2 is about 0.20 inches. The attachment and carrying loads of compartment structure 25 are thus transmitted into vehicle frame 44 through the thicker first side 94 and into the transverse structural beams. Load carrying is accomplished by the transverse structural beam as it passes through the vertical wall. The attachment of transverse structural beam 42 to first side 94, preferably by fusion, restrains side to side movement of the beam relative to the wall, and is not in the primary load path for vertical loads. The attachment of the transverse structural beam to plate 78, preferably by fusion, increases the lateral stability of structure 25, and is not a primary path for transmission of vertical loads.

Figure 5:
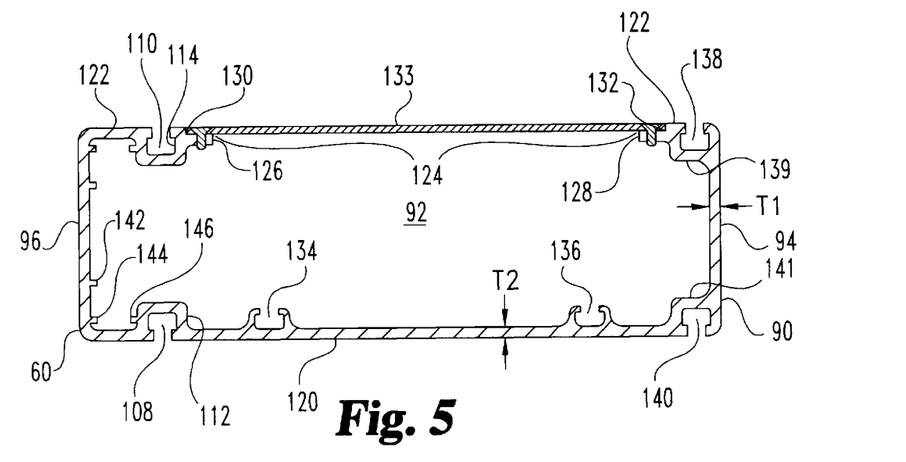
FIG. 5 is a cross-sectional view of an elongate structural member according to one embodiment of the present invention as taken along line 5—5 of FIG. 3.

FIG. 5 is a cross-sectional view of an elongate structural member according to one embodiment of the present invention as taken along line 5—5 of FIG. 3. Although elements, features, and attributes of elongate structural member 60 are shown and described, these elements, features, and attributes apply also to other C-shaped structural members according to various embodiments of the present invention. Channel member 60 has a C-shaped, generally rectangular cross-sectional shape 90. Cross-sectional shape 90 includes a third side 120 that interconnects first side 94 and second side 96. A fourth side 122 generally opposite third side 120 has a portion removed so as to define an elongate opening 124 with a first elongate edge 126 and a second elongate edge 128. Elongate opening 124 permits access to interior 92 of C-shape 90 and thus permits mounting of various components, including by way of example only valves, hoses, electrical components, and electrical wiring, within interior 92 of C-shape 90.

Located along edges 126 and 128 are first shoulder 130 and second shoulder 132, respectively. Shoulders 130 and 132 are arranged and constructed to accept access panel 133 therebetween. An access panel may be fastened to shoulders 130 and 132 so as to limit access and protect any components within interior 92. Shoulders 130 and 132 are recessed from the surface of fourth side 122 so that attached access panel 133 is preferably made generally flush with the outside surface of side 122.

Mounting of components with interior 92 is facilitated by first internal elongate T slot 134 and second internal elongate T slot 136. T slots 134 and 136 are located along the inner side of third side 120. T slots 134 and 136 are drilled open at a location along the channel member (not shown). At this drilled open location the head of a fastener, such as a hex head or square head fastener, may be inserted within the T slot and slid within the T slot to a location where the component is to be fastened. The internal width of the T slot is greater than the minimum width of the fastener received therein, but less than the maximum width of the fastener, thereby restraining rotation of the fastener.

A pair of generally opposed elongate external T slots 138 and 140 are located on a channel member along first side 94. Elongate external T slots 110 and 138 are located along edges 126 and 128, respectively, of elongate opening 124. T slots 138 and 140 include walls 139 and 141, respectively, that are radiused into first side 94. The radius transitions from the walls of the T slots to the first side of the channel member provide additional bearing area for the vertical loads transmitted from compartment structure 25 into a transverse structural beam. External elongate T slots 108, 110, 138, and 140 restrain rotational movement of a fastener located therein, in a manner as previously described for internal T slots 134 and 136.

T slots 108, 110, 138, and 140 are useful for mounting components including shelves within a compartment. As best seen in FIG. 3, slots 108 and 140 of third side 120 of channel member 72 are especially useful for supporting one side of a shelf (not shown), the other side of the shelf being supported by slots 110 and 138 of channel member 68. Thus, it is not necessary to mount one or more vertical shelf support brackets within a compartment. Slots 108, 110, 138, and 140 provide an attachment means for mounting a shelf or equipment, such that the shelf or equipment may be substantially flush against third side 120 or against panel 133.

Third side 120 of member 72, side 120 of channel 60, and an access panel (not shown) along fourth side 122 of channel member 68 form three walls of compartment 30. In one embodiment of the present invention third side 120 is about 12 inches long and first side 94 is about 4 inches long. Thus, third side 120 in this particular embodiment forms a wall of a compartment that is conveniently 12 inches deep. In one embodiment of the present invention a stiffening plate 75 (see FIG. 3) is attached to third side 120 of bottom member 74 so as to stiffen third side 120 for support of persons or equipment.

A first projection 142 and a second projection 144 extend from second side 96 of a channel member. Projections 142 and 144 are arranged and configured to stop the rotation of a fastener located therebetween. Projection 142 and 144 are spaced apart by a distance that is greater than the minimum distance of a fastener such as a square head or hex head, nut, but spaced apart less than the maximum cross-sectional distance of the fastener. Thus, rotation of the fastener is restrained between projections 142 and 144.

A third projection 146 located along wall 112 of T slot 108 of side 120 is similarly spaced apart from second projection 144 and thereby arranged and constructed to restrain rotation of a fastener located therebetween. The arrangement of projections 142, 144, and 146 are useful for restraining movement of fasteners along either side 120 or side 96 of a channel member. A similar arrangement of three spaced apart projections is also available for restraining fasteners along fourth side 122 and second side 96. In one embodiment of the present invention projections 142 and 144 are spaced apart by about 0.58 inches. Projections 144 and 146 are also spaced apart by about 0.58 inches. This spacing is suitable for capturing a 5/16 inch square nut.

Although various specific dimensions have been given for certain embodiments of the present invention, those of ordinary skill in the art will recognize that the present invention contemplates greater and lesser dimensions than those specified.

Figure 6:
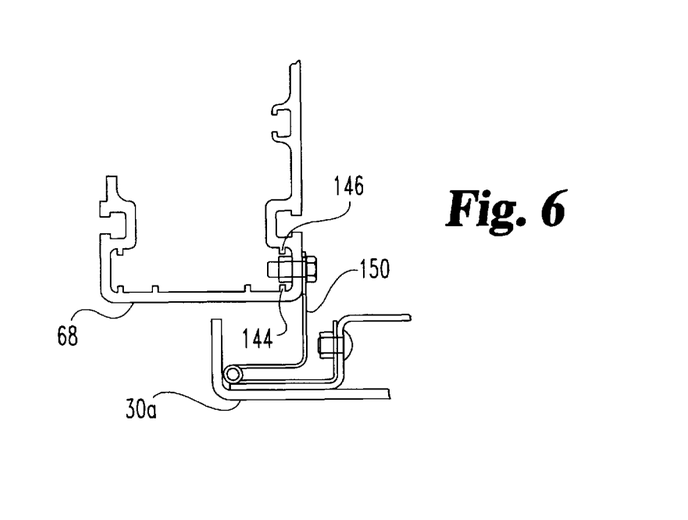
FIG. 6 is a partial cross-sectional view of a hinge and door attached to a channel member according to one embodiment of the present invention.

FIG. 6 is a partial cross-sectional U of a hinge and door attached to a channel member according to one embodiment of the present invention. A door 30a (see FIG. 1) is attached by an offset hinge 150 to channel member 68. A fastener attaches hinge 150 through third wall 120 of channel member 68 with part of the fastener being captured between projections 144 and 146. This allows for making adjustments to the hinge without needing to gain access to the nut. As shown in FIG. 6, door 30a conceals and protects hinge 150 when door 30a is closed.

Figure 13:
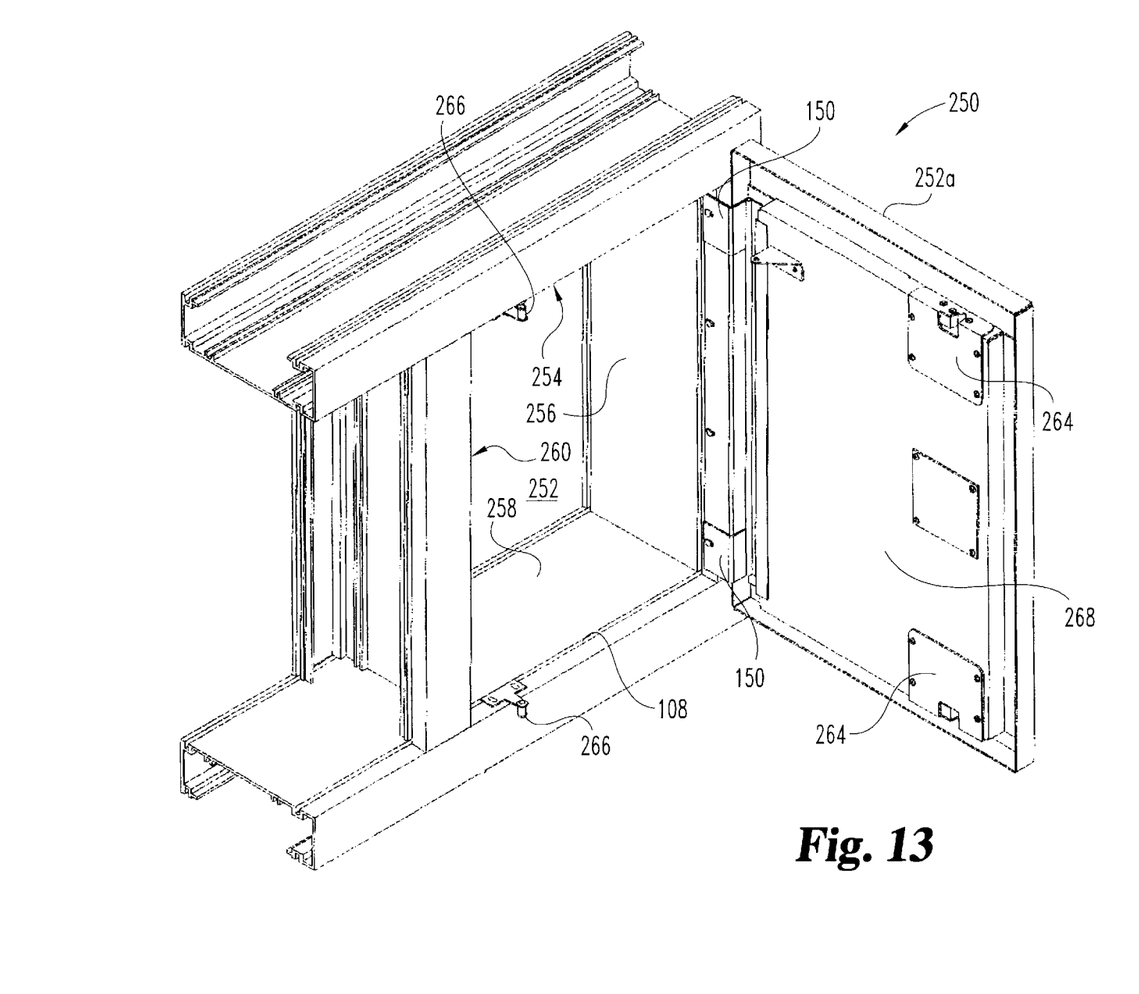
FIG. 13 is a top and side perspective view of a compartment with a door according to one embodiment of the present invention.

FIG. 13 is a top and side perspective view of a compartment with a door according to one embodiment of the present invention. The top portion of a compartment structure 250 is shown which includes within it a compartment 252 with a plurality of walls 254, 256, 258 and 260, each wall preferably being a third wall of a channel member according to the present invention. A door 252a is supported by a pair of hinges 150 from a channel member in a manner as shown in FIG. 6. Door 252a includes top and bottom latch mechanisms 264 that secure door 252a to top and bottom strikers 266. Strikers 266 are fastened to their respective channel members in such a manner that the pin of the striker points away from the center of the compartment and does not protrude into the projected area of compartment 252 and thereby does not restrict access into compartment 252. As can be seen in FIGS. 6 and 13, with the use of an offset hinge 150, doors 30a and 252a substantially cover the outward surfaces of the channel members and eliminate the need for painting the outward and exterior surfaces of the channel members. In addition, pan 268 of door 252a is substantially flush with wall 256 of compartment 252 when door 252a is open as shown in FIG. 13. Thus, the offset of hinge 150 and the arrangement of the door pan keep door 252a from restricting access to compartments 252.

Figure 7:
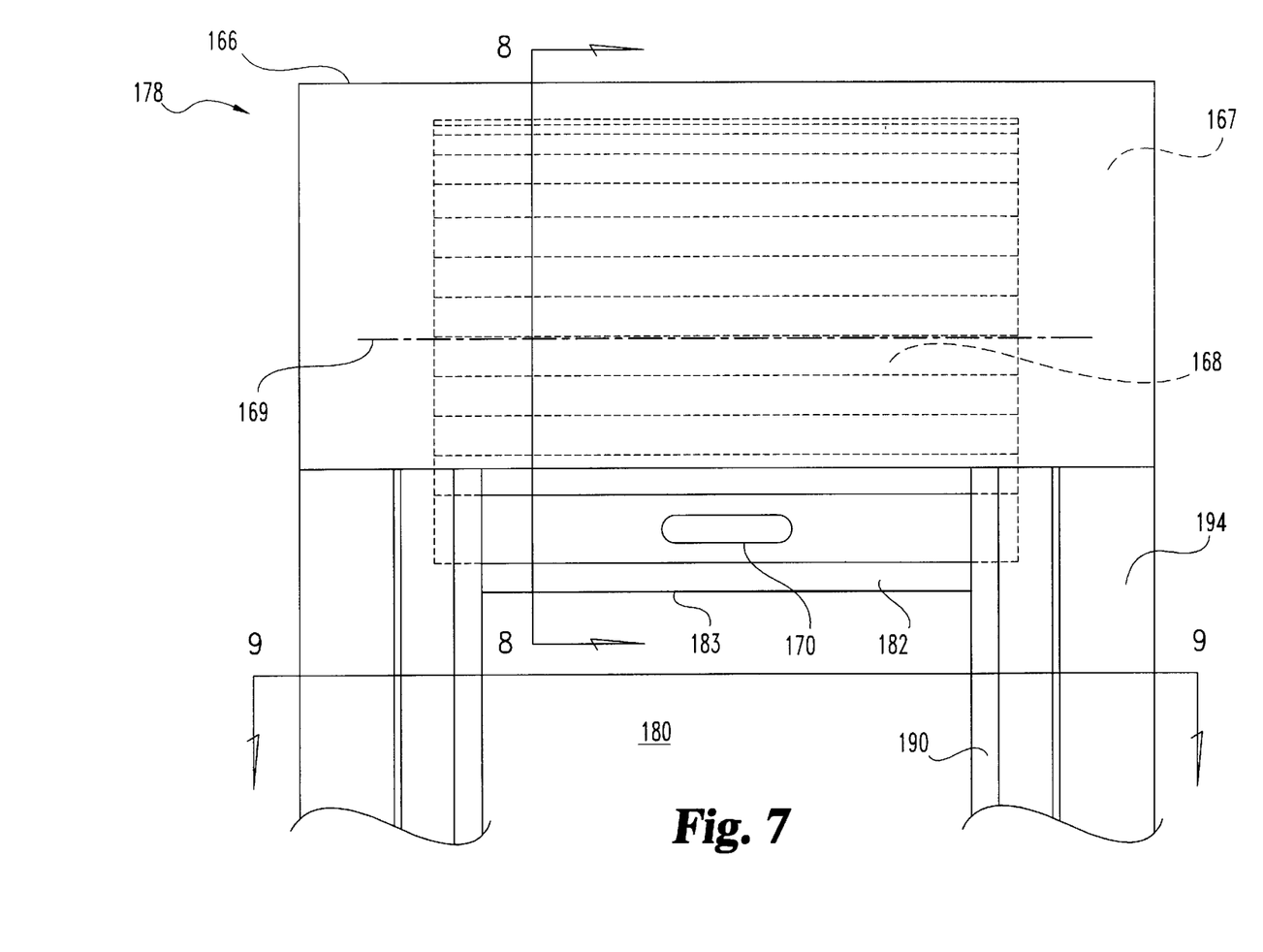
FIG. 7 is a side elevational view of a portion of a compartment of a utility section.
Figure 8:
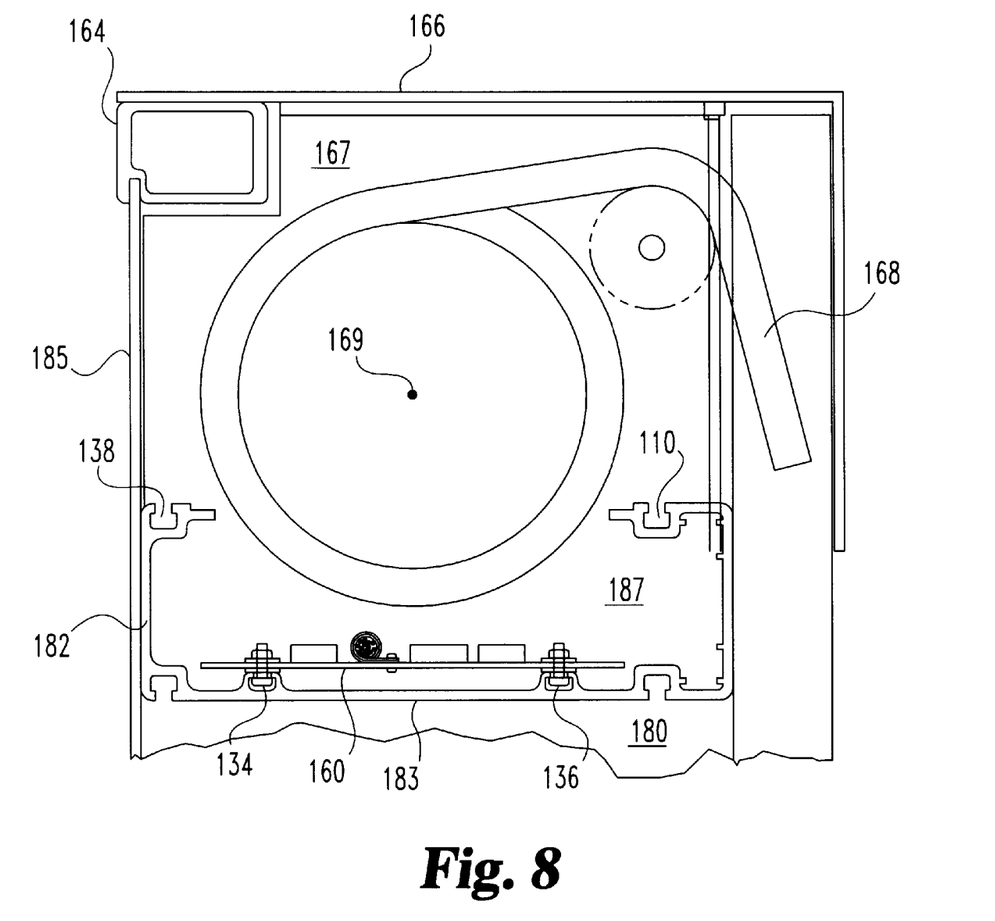
FIG. 8 is a cross-sectional view of FIG. 7 as taken along line 8—8 of FIG. 7.

FIG. 7 is a side elevational view of a portion of a compartment of a utility section. The top portion of a compartment structure 178 is shown which includes within it a compartment 180 with a plurality of walls. Compartment structure 178 includes an elongate channel member 182 with a cross-sectional shape preferably identical to that as shown in FIG. 5. Third side 183 of channel 182 provides a top wall to compartment 180. A sheet metal cover 166 is coupled to the top of the compartment structure, as seen in FIGS. 7 and 8. Located underneath cover 166 and above wall 183 of compartment 180 is a roll up door 168. Roll up door 168 rotates about a rotational axis 169 which is located above top wall 183 of compartment 180. Roll up door 168 is attached by brackets (not shown) to channel member 182 by fasteners within T slots 138 and 110.

Figure 9:
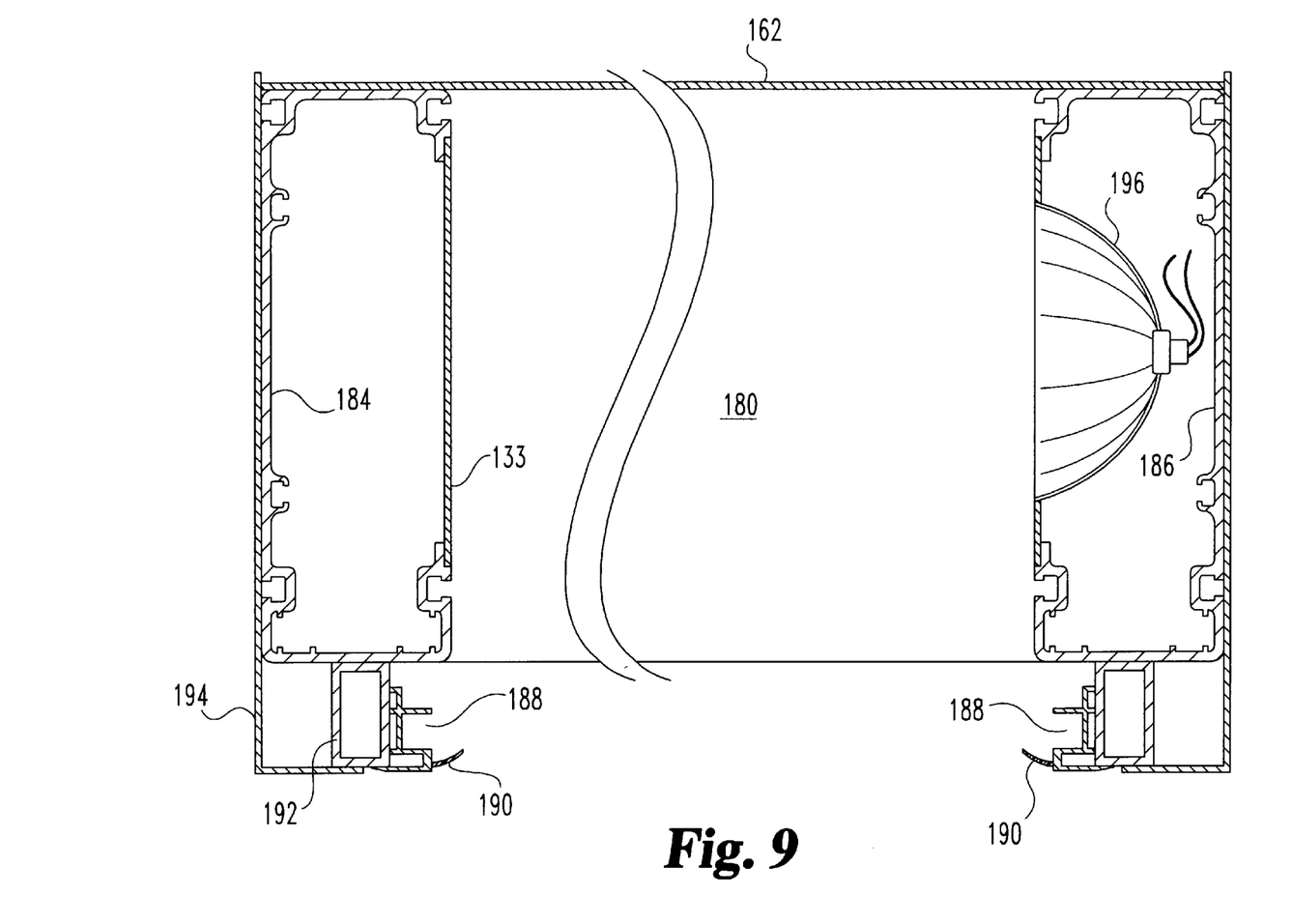
FIG. 9 is a cross-sectional view of FIG. 7 as taken along line 9—9 of FIG. 7.

As shown in FIGS. 7 and 8, roll up door 168 is shown in the stowed position, although door 168 is slightly extended past the front of support 166 in FIG. 7. When stowed, roll up door 168 is within a substantially cylindrical envelope, with a portion of the rolled up stowed door being within interior 187 of channel member 182 as seen in FIG. 8. Another portion of the stowed door is within a top most compartment 167 within structure 166. Utilizing interior 187 for partial storage of door 168 permits a reduction in the height and weight of compartment structure 178. By pulling on handle 170, door 168 may be unrolled so as to cover at least a portion of compartment 180, thus protecting tools and equipment stored therein. As door 168 is unrolled, the vertical edges of the door are captured within vertical tracks 188, as best seen in FIG. 9. Elastomeric seals 190 provide a water and weatherproof seal against the front of door 168. Tracks 188 and seals 190 are supported by structural tubing channels 192. Tubes 192 are supported by side support structures 194. Tracks 188 and seals 190 are arranged such that when door 168 is in the stowed position, tracks 188 and seals 190 do not restrict access into or out of compartment 180. The use of support structure 194, channels 192, tracks 188, and seals 190 generally cover the outside surfaces of channel members 184 and 186, thereby eliminating the need to paint these surfaces.

As seen in FIG. 8, interior 187 channel member 182 forms an electrical raceway along the top of compartment structure 178, similar to the electrical raceway formed by interior 92 of channel member 60 along the top of compartment structure 25. Components 160 are secured by fasteners captured within T slots 134 and 136. A panel 185 forms a back wall of compartment 180, similar to panel 162 which forms a back wall of compartments 26, 28, and 30, as best seen in FIG. 2. Referring again to FIG. 8, a structural member 164 is coupled to back panel 162 and also to top support structure 166 so as to form top most compartment 167.

FIG. 9 is a cross-sectional view of FIG. 7 as taken along line 9—9 of FIG. 7. As best seen in FIG. 9, elongate channel members 184 and 186, each preferably having a cross-section identical to that shown in FIG. 5, provide side supports for compartment structure 178. Panels 133 fastened to channel members 184 and 186 provide portions of side walls for compartment 180. A reflector 196 for a compartment light is shown attached to a panel 133.

Placement of roll up door 168 above top wall 183 protects door 168 from damage caused by long handle tools or other equipment stored within compartment 180. Also, should door 168 jam in the unrolled position, it can be removed quickly during an emergency by simply unfastening support structure 166 and lifting door 168 away from compartment structure 178. Thus, there is no need to hack open a jammed roll up door during an emergency. In addition, if door 168 is wet when it is rolled into the stowed position, water dripping from door 168 does not drip on equipment stored within compartment 180. Components 160 kept within interior 187 are suitably protected from the moisture.

Although the C-shaped elongate structural members of the present invention are preferably single piece aluminum extrusions, the present invention also contemplates elongate multipiece structures joined in a conventional manner. FIGS.

Figure 10:
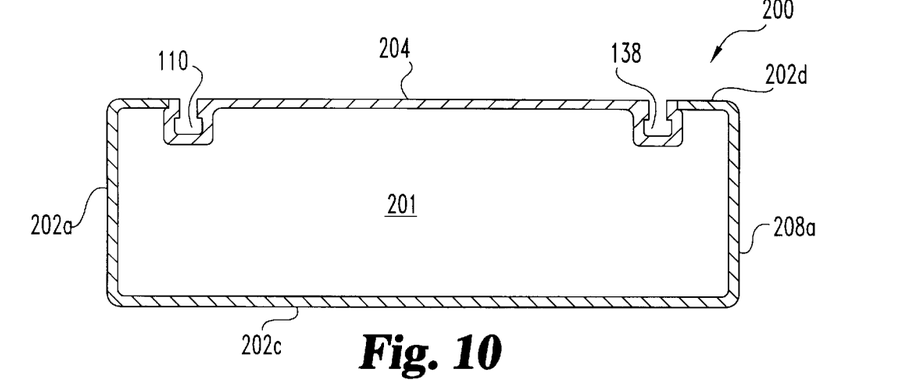
FIG. 10 is a cross sectional view of a multipiece channel member according to one embodiment of the present invention.
Figure 11:
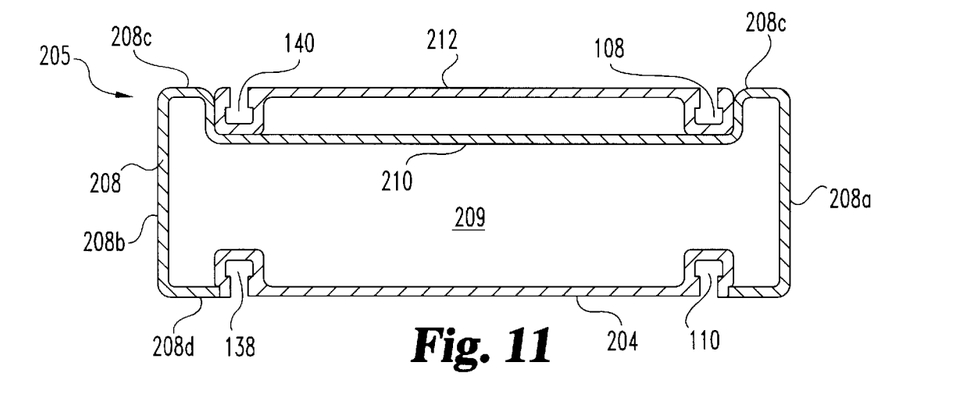
FIG. 11 is a cross sectional view of a multipiece channel member according to one embodiment of the present invention.
Figure 12:
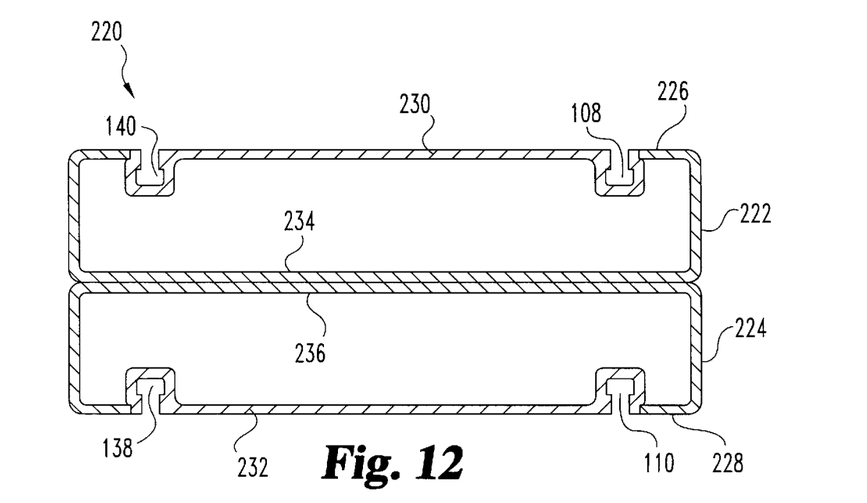
FIG. 12 is a cross sectional view of a pair of multipiece channel members according to one embodiment of the present invention.

10, 11, and 12 depict multipiece structural members which have attached to them separate panels that incorporate one or more T slots useful in a manner as T slots 110, 138, 108, and 140 previously described.

FIG. 10 shows a cross section of a channel member according to one embodiment of the present invention. An elongate channel member 200 includes opposing first and second sides 202a and 202b, respectively, and an interconnecting third side 202c, the three sides defining an interior 201. Channel member 200 is preferably formed from sheet metal aluminum, but may be formed, molded, cast, extruded or otherwise fabricated from a metal, plastic, or composite material.

A fourth side 202d is generally opposite of third side 202c. A portion of side 202d has been removed to define an elongate opening. A panel 204 defining at least one T slot, and preferably defining a pair of T slots 110 and 138 is configured to fit within at least a portion of the elongate opening, and is attached to channel member 200 by a method such as welding or fastening. In some embodiments panel 204 covers only a portion of the opening, thus providing access to interior 201.

FIG. 11 shows a cross section of a channel member according to one embodiment of the present invention. An elongate channel member 205 includes opposing first and second sides 208a and 208b, respectively, and an interconnecting third side 208c, defining an interior 209. Channel member 205 is preferably formed from sheet metal aluminum, but may be formed, molded, cast, extruded or otherwise fabricated from a metal, plastic, or composite material.

A fourth side 208d is generally opposite of third side 202c. A portion of side 202d has been removed to define an elongate opening. A panel 204 preferably defining a pair of T slots 110 and 138 is configured to fit within at least a portion of the elongate opening, and is attached to channel member 205 by a method such as welding or fastening.

A pocket 210 is created within third side 208c. Pocket 210 is configured and arranged to accept within it a panel 212 with at least one T slot, and preferably two T slots 108 and 140. Panel 212 is configured and arranged to fit within pocket 210, and is attached to channel member 205 by a method such as welding or fastening.

FIG. 12 is a cross sectional view of a pair of channel members according to one embodiment of the present invention. An apparatus 220 includes a first channel member 222 and a second channel member 224. A portion of fourth side 226 of member 222 has been removed to define an elongate opening configured and arranged to accept a panel 230. Panel 230 defines at least one T slot, and preferably two T slots 140 and 108. A portion of fourth side 228 of member 224 has been removed to define an elongate opening configured and arranged to accept a panel 232. Panel 232 defines at least one T slot, and preferably two T slots 140 and 108.

The third side 234 of member 222 abuts the third side 236 of channel member 224. The first channel 222 is attached to the second channel 224 in a variety of conventional ways, including by way of example only fusion, fasteners, clamps, and similar ways.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising:
  a vehicle;
  a compartment structure defining at least one storage compartment for said vehicle, said storage compartment structure including a plurality of elongate structural members;
  at least one of said plurality of elongate structural members having a cross section that is generally C shaped and defining an elongate opening, the C shape of said at least one structural member defining an interior; and
  a first elongate slot within the interior of said at least one elongate structural member, said first elongate slot being configured and arranged to restrain movement of a fastener used for attaching a component within the interior, said first elongate slot being accessible through the elongate opening.

2. The apparatus of claim 1, which further comprises a second elongate slot within the interior of said at least one elongate structural member, said second elongate slot being configured and arranged to restrain movement of a fastener used for attaching a component within the interior, said second elongate slot being accessible through the elongate opening.

3. The apparatus of claim 1, which further comprises a first projection and a second projection extending within the interior, said first projection and said second projection being spaced apart and configured and arranged to restrain rotation of a fastener located therebetween.

4. The apparatus of claim 1, which further comprises a first shoulder along one edge of the elongate opening and a second shoulder along the other edge of the elongate opening.

5. An apparatus comprising:
  an elongate channel member having at least three sides, at least three sides defining an interior, said channel member having a fourth side, a portion of the fourth side being removed to define an elongate opening;
  a first projection and a second projection extending from a first one of said sides and within the interior, said first projection and said second projection being spaced apart and configured and arranged to stop rotation of a fastener located therebetween; and
  a third projection extending from a second one of said sides and within the interior, said third projection being spaced apart from one of said first projection or said second projection and configured and arranged to stop rotation of a fastener located between said third projection and the one of said first projection or said second projection.

6. The apparatus of claim 5, wherein said channel member has an edge, and which further comprises a first external slot along the edge, said first external slot being configured and arranged to restrain a fastener located therein.

7. The apparatus of claim 5, which further comprises a compartment structure for a vehicle, said compartment structure defining at least one storage compartment, wherein said compartment structure includes said elongate channel member.

8. An apparatus comprising:
  a removable panel; and
  an elongate channel member, said member having three sides arranged in a generally rectangular cross section and a fourth side, a portion of the fourth side being removed to define an elongate opening with two edges, said member defining an interior cavity, said member having a first shoulder along one edge of the elongate opening and a second shoulder along the other edge of the elongate opening, said first shoulder and said second shoulder being configured to accept said removable panel therebetween, whereby said removable panel restricts access to the interior cavity.

9. The apparatus of claim 8, which further comprises a first external T slot along one said edge.

10. The apparatus of claim 8, which further comprises a compartment structure for a vehicle, said compartment structure defining at least one compartment, wherein said compartment structure includes said elongate channel member.

11. An apparatus comprising:
a structural beam having a width, an end, and a cross sectional shape;
a vehicle;
a first compartment structure defining at least one storage compartment for said vehicle, said compartment structure including at least one elongate structural member having a cross section that is generally C shaped thereby defining an interior, said at least one structural member having a first side and a second side generally opposite each other; and
a plate adapted to fit within the interior of said at least one structural member, said plate being attached to said at least one structural member adjacent to said second side;
wherein the first side defines a first hole generally in the shape of the cross sectional shape of said structural beam, one end of said structural beam being attached to said plate, said structural beam protruding through the first hole and being attached to said first side.

12. The apparatus of claim 11 wherein:
said plate defines a second hole generally in the shape of the cross sectional shape of said structural beam, one end of said structural beam protruding through at least a portion of the second hole and being attached to said plate.

13. The apparatus of claim 11, which further comprises a second compartment structure joined by said structural beam to said first compartment structure.

14. The apparatus of claim 11, which further comprises a first elongate T slot within the interior of said at least one structural member.

15. The apparatus of claim 11, wherein said at least one compartment has a wall, and a portion of said at least one structural member forms said wall.

16. An apparatus comprising:
a vehicle;
a structural member of said vehicle, said member having three sides arranged in a generally rectangular cross section said structural member defining an elongate opening and two edges, said member defining an interior, the elongate opening allowing access to the interior, a first external slot along one said edge and a second external slot along the other said edge, said first external slot being adapted to restrain a fastener located therein and said second external slot being adapted to restrain a fastener located therein.

17. The apparatus of claim 16, which further comprises a first internal slot within the interior of said structural member, said first internal slot being configured and arranged to restrain movement of a fastener used for attaching a component within the interior.

18. The apparatus of claim 16, which further comprises a first projection and a second projection extending within the interior, said first projection and said second projection being spaced apart and configured and arranged to restrain rotation of a fastener located therebetween.

19. An apparatus comprising:
a vehicle; and
a compartment structure for said vehicle, said compartment structure defining at least one storage compartment having a plurality of walls and an interior, said compartment structure including at least one extruded elongate C channel member having a first side, a second side generally opposite said first side, and a third side interconnecting said first side and said second side, said third side being a wall of said at least one compartment, said third side defining a first elongate T slot constructed and arranged for mounting a component within the interior of said at least one storage compartment; and
a first projection and a second projection extending from said second side, said first projection and said second projection being configured and arranged to restrain rotation of a fastener located therebetween.

20. The apparatus of claim 19, wherein said third side defines a second elongate T slot constructed and arranged for mounting a component within said at least one compartment.

21. An apparatus comprising:
a vehicle;
a compartment structure for said vehicle, said compartment structure having at least one storage compartment with a plurality of walls, said compartment structure including an elongate channel member having a first side, and a third side interconnecting said first side and said second side, said third side being a top wall of said at least one storage compartment; and
a roll up door rotatable about an axis, the axis being located above said third side, said roll up door being configured and arranged to cover at least a portion of said at least one storage compartment when said door is unrolled.

22. The apparatus of claim 21 wherein said first, second, and third sides define an interior above said third side, said roll up door has a stowed position, and a portion of said roll up door is within the interior when in the stowed position.

23. An apparatus comprising:
a vehicle;
a compartment structure defining at least one storage compartment for said vehicle;
a panel defining a T slot; and
an elongate C channel member forming at least one wall of said storage compartment, said channel member having a first side, a second side generally opposite said first side, and a third side interconnecting said first side and said second side;
wherein said third side defines a pocket for accepting said panel, and said panel is attached within said pocket.

24. An apparatus comprising:
a first elongate channel member, said first channel member having three sides arranged in a generally rectangular cross section and a fourth side, a portion of the fourth side being removed to define an elongate opening, one of said three sides being generally opposite said fourth side;
a first panel defining a T slot, said first panel being configured and arranged to fit within a portion of the elongate opening of said first channel member, said first panel being attached to the elongate opening of said first channel member;

a second elongate channel member, said second channel member having three sides arranged to have the same cross section as the cross section of said first channel member, said second channel member having a fourth side, a portion of the fourth side being removed to define an elongate opening, one of said three sides being generally opposite said fourth side; and a second panel defining a T slot, said second panel being configured and arranged to fit within a portion of the elongate opening of said second channel member, said second panel being attached to said second channel member;

wherein the one said side of said first channel member abuts the one said side of said second channel member, and said first channel member is attached to said second channel member.

25. The apparatus of claim 1 wherein said compartment structure defines a plurality of storage compartments with walls, said walls comprising a plurality of elongate structural members, each of said structural members having a cross section that is generally C shaped and defining an elongate opening, the C shape defining an interior, each of said structural members including an elongate slot within the interior for attaching a component within the interior, said elongate slot being accessible through the elongate opening.

26. The apparatus of claim 25 wherein each said structural member includes a pair of external T slots for mounting equipment against a wall of one of said storage compartments.

27. The apparatus of claim 5 which further comprises:
a vehicle; and
a compartment structure for said vehicle, wherein said compartment structure defines a plurality of storage compartments with walls, said walls comprising a plurality of said elongate channel members.

28. The apparatus of claim which further comprises:
a door for one of said storage compartments;
a hinge attached to said door; and
a fastener attaching said hinge to one of said channel members, said fastener being located between two of said first projection, said second projection, and said third projection of said one channel member.

29. The apparatus of claim 28 wherein said door conceals and protects said hinge when said door is closed.

30. The apparatus of claim 28 which further comprises:
a striker pin attached to one of said channel members of said one storage compartment; and
a latch mechanism attached to said door for securing said door to said striker pin;
wherein said one storage compartment has a projected area, and said striker pin does not protrude into the projected area.

31. The apparatus of claim 28 wherein said door includes an inner pan, said hinge is offset, said one storage compartment includes a wall proximate to said offset hinge, and said inner pan is substantially flush with said wall when said door is open.

32. The apparatus of claim 6 which further comprises a pair of elongate openings within the interior, and a removable panel attached to said elongate channel member for restricting access to the interior.

33. The apparatus of claim 8 wherein said first shoulder and said second shoulder are recessed so that said removable panel is substantially flush with said fourth side when said removable panel is accepted between said first shoulder and said second shoulder, and which further comprises a pair of elongate T slots within the interior cavity for internal mounting of components.

34. The apparatus of claim 9 which further comprises a second external T slot along the other said edge.

35. The apparatus of claim 34 wherein said elongate channel member includes a third external T slot and a fourth external T slot, said third external T slot and said fourth external T slot being on a side generally opposite said removable panel.

36. The apparatus of claim 35 which further comprises:
a vehicle; and
a compartment structure for said vehicle, wherein said compartment structure defines a plurality of storage compartments with walls, said walls comprising a plurality of said elongate channel members.

37. The apparatus of claim 13 which further comprises a pair of elongate T slots within the interior of said at least one structural member.

38. The apparatus of claim 13 which further comprises a second structural beam joining said second compartment structure to said first compartment structure.

39. The apparatus of claim 17 which further comprises a second internal slot within the interior of said structural member, said second internal slot being configured and arranged to restrain movement of a fastener used for attaching a component within the interior.

40. The apparatus of claim 39 which further comprises a removable panel for restricting access to the interior.

41. The apparatus of claim 20 wherein said compartment structure defines a plurality of storage compartments with walls, said walls comprising a plurality of said elongate channel members.

42. The apparatus of claim 22 wherein said roll up door has a pair of vertical edges, and which further comprises a pair of vertical tracks attached to said at least one storage compartment, said tracks being arranged to not restrict access into said at least one storage compartment when said roll up door is in the stowed position.

43. The apparatus of claim 23 wherein said panel defines a second T slot, and said third side defines a third external T slot and a fourth external T slot, said third T slot and said fourth T slot being configured and arranged to restrain a fastener located therein.

44. The apparatus of claim 24 wherein said first panel defines a pair of T slots and said second panel defines a pair of T slots.

45. An apparatus comprising:
a vehicle; and
a compartment structure for said vehicle, said compartment structure defining at least one storage compartment having a plurality of walls and an interior, said compartment structure including at least one extruded elongate C channel member having a first side, a second side generally opposite said first side, and a third side interconnecting said first side and said second side, said third side being a wall of said at least one compartment, said third side defining a first elongate T slot constructed and arranged for mounting a component within the interior of said at least one storage compartment; and
wherein said third side defines a second elongate T slot constructed and arranged for mounting a component within said at least one compartment.

46. The apparatus of claim 45 wherein said compartment structure defines a plurality of storage compartments with walls, said walls comprising a plurality of said elongate C channel members.

47. The apparatus of claim 45, which further comprises a first projection and a second projection extending from said second side, said first projection and said second projection being configured and arranged to restrain rotation of a fastener located therebetween.

48. The apparatus of claim 47 which further comprises:
a third projection extending from said third side, said third projection being spaced apart form one of said first projection or said second projection and configured and arranged to stop rotation of a fastener located between said third projection and the one of said first projection or said second projection.

49. The apparatus of claim 45 wherein said at least one elongate C channel member defines an interior and an elongate opening, and which further comprises a first elongate slot within the interior of said at least one elongate structural member, said first elongate slot being configured and arranged to restrain movement of a fastener used for attaching a component within the interior of said member, said first elongate slot being accessible through the elongate opening, and a second elongate slot within the interior of said at least one elongate C channel member, said second elongate slot being configured and arranged to restrain movement of a fastener used for attaching a component within the interior of said member, said second elongate slot being accessible through the elongate opening.

50. The apparatus of claim 49 which further comprises:
a first external slot along one edge of said elongate opening and a second external slot along another said edge of said elongate opening, said first external slot being adapted to restrain a fastener located therein and said second external slot being adapted to restrain a fastener located therein, and wherein said vehicle is a fire truck.

51. The apparatus of claim 19 which further comprises:
a third projection extending from said third side, said third projection being spaced apart from one of said first projection or said second projection and configured and arranged to stop rotation of a fastener located between said third projection and the one of said first projection or said second projection.

52. The apparatus of claim 19 wherein said at least one elongate C channel member defines an interior and an elongate opening, and which further comprises a first elongate slot within the interior of said at least one elongate C channel member, said first elongate slot being configured and arranged to restrain movement of a fastener used for attaching a component within the interior of said member, said first elongate slot being accessible through the elongate opening, and a second elongate slot within the interior of said at least one elongate C channel member, said second elongate slot being configured and arranged to restrain movement of a fastener used for attaching a component within the interior of said member, said second elongate slot being accessible through the elongate opening.

53. The apparatus of claim 52 which further comprises:
a first external slot along one edge of said elongate opening and a second external slot along another edge of said elongate opening, said first external slot being adapted to restrain a fastener located therein and said second external slot being adapted to restrain a fastener located therein, and wherein said vehicle is a fire truck.

54. The apparatus of claim 52 wherein said elongate C channel member has a first shoulder along one edge of the elongate opening and a second shoulder along the other edge of the elongate opening, and which further comprises a removable panel, said first shoulder and said second shoulder being configured to accept said removable panel therebetween, whereby said removable panel restricts access to the interior of said member.

55. The apparatus of claim 22 wherein a first elongate slot within the interior of said one elongate channel member, said first elongate slot being configured and arranged to restrain movement of a fastener used for attaching a component within the interior and a second elongate slot within the interior of said at least one elongate channel member, said second elongate slot being configured and arranged to restrain movement of a fastener used for attaching a component within the interior.

56. The apparatus of claim 22 wherein said elongate channel member defines an elongate opening providing access to the interior, said elongate opening having two edges, said member having a first shoulder along one edge of the elongate opening and a second shoulder along the other edge of the elongate opening, and which further comprises a removable panel, said first shoulder and said second shoulder being configured to accept said removable panel therebetween, whereby said removable panel restricts access to at least a portion of the interior.

57. The apparatus of claim 21 wherein said first, second, and third sides define an interior, and which further comprises:
a first projection and a second projection extending from a first one of said sides and within the interior, said first projection and said second projection being spaced apart and configured and arranged to stop rotation of a fastener located therebetween; and
a third projection extending from a second one of said sides and within the interior, said third projection being spaced apart from one of said first projection or said second projection and configured and arranged to stop rotation of a fastener located between said third projection and the one of said first projection or said second projection.

58. The apparatus of claim 21 wherein said first, second, and third sides define an elongate opening, two edges along said elongate opening, and an interior, and which further comprises a first external slot along one said edge and a second external slot along the other said edge, said first external slot being adapted to restrain a fastener located therein and said second external slot being adapted to restrain a fastener located therein, and wherein said vehicle is a fire truck.

59. The apparatus of claim 21 wherein said at least one storage compartment has an interior, and said third side of said elongate channel member defines a first elongate T slot constructed and arranged for mounting a component within the interior of said at least one storage compartment.

60. The apparatus of claim 23 wherein said vehicle is a fire truck.

61. The apparatus of claim 43 wherein said compartment structure defines a plurality of storage compartments with walls, said walls comprising a plurality of elongate C channel members.

62. The apparatus of claim 44, which further comprises:
a vehicle; and
a compartment structure for said vehicle, wherein said compartment structure defines a plurality of storage compartments with walls, said walls comprising a plurality of said first elongate channel members and a plurality of said second elongate channel members.

63. The apparatus of claim 62 wherein said vehicle is a fire truck.

64. The apparatus of claim 26 wherein said vehicle is a fire truck.

65. The apparatus of claim 38 wherein said vehicle is a fire truck.

66. The apparatus of claim 40 wherein said vehicle is a fire truck.

* * * * *